US007557924B2

(12) United States Patent
Nisper et al.

(10) Patent No.: US 7,557,924 B2
(45) Date of Patent: Jul. 7, 2009

(54) APPARATUS AND METHODS FOR FACILITATING CALIBRATION OF AN OPTICAL INSTRUMENT

(75) Inventors: Jon K. Nisper, Grand Rapids, MI (US); Michael J. Mater, Chelsea, MI (US)

(73) Assignee: X-Rite, Inc., Grand Rapids, MI (US)

( * ) Notice: Subject to any disclaimer, the term of this patent is extended or adjusted under 35 U.S.C. 154(b) by 324 days.

(21) Appl. No.: 11/504,120

(22) Filed: Aug. 15, 2006

(65) Prior Publication Data

US 2007/0035740 A1 Feb. 15, 2007

Related U.S. Application Data

(60) Provisional application No. 60/710,920, filed on Aug. 24, 2005, provisional application No. 60/708,222, filed on Aug. 15, 2005.

(51) Int. Cl.
*G01J 3/51* (2006.01)
(52) U.S. Cl. .................................. 356/419; 356/406
(58) Field of Classification Search ................. 356/416, 356/419
See application file for complete search history.

(56) References Cited

U.S. PATENT DOCUMENTS

| | | | |
|---|---|---|---|
| 4,558,786 A | 12/1985 | Lane | |
| 4,566,797 A | 1/1986 | Kaffka et al. | |
| 4,618,257 A | 10/1986 | Bayne et al. | |
| 4,707,838 A | 11/1987 | Reule et al. | |
| 4,797,609 A | 1/1989 | Yang | |
| 4,917,500 A * | 4/1990 | Lugos | 356/406 |
| 4,986,665 A * | 1/1991 | Yamanishi et al. | 356/402 |
| 5,072,128 A | 12/1991 | Hayano et al. | |
| 5,137,364 A | 8/1992 | McCarthy | |
| 5,311,293 A | 5/1994 | MacFarlane et al. | |
| 5,313,267 A | 5/1994 | MacFarlane et al. | |
| 5,471,052 A | 11/1995 | Ryczek | |
| 5,671,735 A | 9/1997 | MacFarlane et al. | |
| 5,759,030 A * | 6/1998 | Jung et al. | 433/29 |
| 5,838,451 A | 11/1998 | McCarthy | |
| 5,844,680 A | 12/1998 | Sperling | |
| 5,854,680 A | 12/1998 | Rakitsch | |

(Continued)

FOREIGN PATENT DOCUMENTS

EP 0117606 A1 9/1984

(Continued)

OTHER PUBLICATIONS

U.S. Appl. No. 11/504,187, filed Aug. 15, 2006 (22 pages).

(Continued)

*Primary Examiner*—F. L Evans
(74) *Attorney, Agent, or Firm*—McCarter & English, LLP

(57) ABSTRACT

An optical system comprising an optical instrument and a processing unit. The optical instrument may comprise an illumination source and a sensor. The processing unit may comprise a data storage having stored thereon a characterization of the illumination source and a characterization of the sensor. The processing unit may also comprise a computer configured to calculate a system response of the illumination source and the receiving element considering the characterization of the illumination source and the characterization of the receiving element.

20 Claims, 8 Drawing Sheets

U.S. PATENT DOCUMENTS

| | | | |
|---|---|---|---|
| 5,917,183 | A | 6/1999 | Sperling |
| 6,020,583 | A | 2/2000 | Walowit et al. |
| 6,067,504 | A | 5/2000 | MacFarlane et al. |
| 6,129,664 | A | 10/2000 | Macfarlane et al. |
| 6,147,761 | A | 11/2000 | Walowit et al. |
| 6,157,445 | A | 12/2000 | Macfarlane et al. |
| 6,178,341 | B1 | 1/2001 | Macfarlane et al. |
| 6,271,920 | B1 | 8/2001 | Macfarlane et al. |
| 6,308,088 | B1 | 10/2001 | MacFarlane et al. |
| 6,314,372 | B1 | 11/2001 | Macfarlane et al. |
| 6,330,341 | B1 | 12/2001 | Macfarlane et al. |
| 6,384,918 | B1 | 5/2002 | Hubble, III et al. |
| 6,400,099 | B1 | 6/2002 | Walker |
| 6,556,932 | B1 | 4/2003 | Mestha et al. |
| 6,577,395 | B1 | 6/2003 | Berns et al. |
| 6,584,435 | B2 | 6/2003 | Mestha et al. |
| 6,587,793 | B2 | 7/2003 | Viassolo et al. |
| 6,621,576 | B2 | 9/2003 | Tandon et al. |
| 6,653,992 | B1 | 11/2003 | Colbeth et al. |
| 6,661,513 | B1 | 12/2003 | Granger |
| 6,690,471 | B2 | 2/2004 | Tandon et al. |
| 6,721,692 | B2 | 4/2004 | Mestha et al. |
| 6,732,917 | B1 | 5/2004 | Benz et al. |
| 6,760,124 | B1 | 7/2004 | Boerger et al. |
| 6,765,674 | B2 | 7/2004 | Orelli et al. |
| 6,844,931 | B2 | 1/2005 | Ehbets |
| 6,903,813 | B2 | 6/2005 | Jung et al. |
| 6,958,810 | B2 | 10/2005 | Jung et al. |
| 7,027,186 | B2 | 4/2006 | Sano et al. |
| 7,057,727 | B2 | 6/2006 | Ott |
| 7,113,281 | B2 | 9/2006 | Ott |
| 2003/0098896 | A1 | 5/2003 | Berns et al. |
| 2004/0208210 | A1 | 10/2004 | Inoguchi |
| 2005/0036163 | A1 | 2/2005 | Edge |
| 2006/0244806 | A1 | 11/2006 | Overbeck et al. |
| 2006/0244935 | A1 | 11/2006 | Overbeck et al. |
| 2006/0244948 | A1 | 11/2006 | Overbeck |
| 2006/0244960 | A1 | 11/2006 | Overbeck et al. |

FOREIGN PATENT DOCUMENTS

| | | | |
|---|---|---|---|
| EP | 0292957 | B1 | 4/1991 |
| EP | 0642012 | A1 | 3/1995 |
| EP | 0871025 | A1 | 10/1998 |
| EP | 0696867 | B1 | 3/2000 |
| EP | 1001393 | A2 | 5/2000 |
| EP | 1291628 | A2 | 3/2003 |
| EP | 1293762 | A2 | 3/2003 |
| EP | 1326199 | A2 | 7/2003 |
| EP | 0936400 | B1 | 3/2006 |
| GB | 1589335 | A | 5/1981 |
| JP | 59060324 | A | 4/1984 |
| JP | 2003185591 | A | 7/2003 |
| WO | WO 98/11410 | A1 | 3/1998 |
| WO | WO 00/16045 | A1 | 3/2000 |
| WO | WO 01/16990 | A1 | 3/2001 |
| WO | WO 03/007663 | A1 | 1/2003 |
| WO | WO 03/083765 | A1 | 10/2003 |
| WO | WO 2004/056135 | A1 | 7/2004 |
| WO | WO 2005/013365 | A2 | 2/2005 |
| WO | WO 2005/050148 | A2 | 6/2005 |
| WO | WO 2005/114118 | A1 | 12/2005 |
| WO | WO 2006/020833 | A2 | 2/2006 |
| WO | WO 2006/053808 | A1 | 5/2006 |

OTHER PUBLICATIONS

International Search Report for PCT/US06/12416, Jan. 25, 2007 (4 pages).

International Search Report for PCT/US2006/031891, Feb. 5, 2007 (8 pages).

International Search Report for PCT/US2006/031892, Feb. 16, 2007 (8 pages).

James H. Nobbs, "Colour-Match Prediction for Pigmented Materials," from *Colour Physics for Industry*, Chapter 6, pp. 292-372, (Roderick McDonald ed., Society of Dyers and Colourists, 2d ed. 1997).

Gunter Wyszecki & W.S. Stiles, *Color Science: Concepts and Methods, Quantitative Data and Formulae*, pp. 221-222, 785-786, (Joseph W. Goodman ed., John Wiley & Sons, Inc., 2d. ed. 1982).

Rolf G. Kuehni, Verona Division of Mobay Chemical Corp., *Computer Colorant Formulation*, Chapters 3-6, pp. 11-86, (Lexington Books 1975).

Paul Henry Hoffenberg, Automated Color-Matching of Printed Ink films (1972) (unpublished Ph.D. dissertation, Lehigh University) (on file with UMI Dissertation Information Service).

Raja Balasubramanian, *Optimization of the Spectral Neugebauer Model for Printer Characterization*, 8 Journal of electronic Imaging 156, 156-166 (1999).

Henry R. Kang, *Applications of Color Mixing Models to electronic Printing*, 3 Journal of Electronic Imaging 276, 276-87 (1994).

R.D. Hersch et al., *Spectral Prediction and Dot Surface Estimation Models for Halftone Prints*, 5293 SPIE 356, 356-69 (2004).

Safer Mourad, Color Predicting Model for Electrophotographic Prints on Common Office Paper (2003) (unpublished M.S. thesis, Swiss Federal Institute of Technology), at htt://dlwww.epfl.ch/w31sp/pub/papers/colour/thesis-mourad.pdf.

* cited by examiner

APPARATUS AND METHODS FOR FACILITATING CALIBRATION OF AN OPTICAL INSTRUMENT

CROSS-REFERENCE TO RELATED APPLICATIONS

This application claims the benefit of U.S. Provisional Application No. 60/710,920 filed on Aug. 24, 2005, and U.S. Provisional Application No. 60/708,222, filed on Aug. 15, 2005, which are incorporated herein by reference. This application is also related to a concurrently filed United States patent application entitled, "IMPROVED OPTICAL INSTRUMENT AND COMPONENTS THEREOF," by Jon Nisper, Mike Mater and Bernie Berg, which is herein incorporated by reference.

BACKGROUND

Spectrometers, colorimeters, and other optical instruments have been used for years to measure various properties of materials (e.g., hue, lightness, chemical composition, etc.) by illuminating a material sample and analyzing light or other radiation that is either reflected by or transmitted through the sample. Due to the large range of perceivable differences in reflected light, it is desirable for these instruments to have a high degree of accuracy, repeatability, and inter-instrument agreement.

Some existing methods for manufacturing optical instruments meet these goals by driving the hardware output of the optical instruments toward an accepted standard. For example, instruments may be constructed with tight-tolerance components and then mechanically tuned and adjusted to the accepted standard during the manufacturing process. These methods, however, do not adequately account for changes in the instrument in the field due to temperature, age, environmental conditions, etc. This is left to simple calibration procedures, which are often inadequate. Also, these methods are limited in the types of components that they can use. For example, low cost, efficient illumination sources, such as light emitting diodes (LED's) cannot be easily used because they are not currently available with sufficiently tight tolerances, and because their spectral output varies with temperature.

Other existing methods for manufacturing optical instruments attempt to use looser tolerance components, such as LED's, by developing instrument-level correction factors that are applied to the hardware output in an attempt to bring it into conformance with the accepted standard. The correction factors are developed based on an extensive and often expensive, characterization of the instrument as a whole. Instrument level characterizations, though, are often not adequate to compensate for complex non-linear changes in the instruments due to changes in temperature and other environmental changes that affect the individual instrument components (such as LED's) in the field.

Still other attempts have been made to address the shortcomings of LED's, however, these also leave room for improvement. For example, various methods have been developed that attempt to stabilize the output of an LED by manipulating its current and voltage drop. Also, some known methods involve heating an LED in an attempt to make its output constant. All of these methods, however, add additional cost and complexity to optical instruments, and still fail to give the optical instrument a desired level of accuracy.

SUMMARY

In one general aspect, the invention is directed to an optical system comprising an optical instrument and a processing unit. The optical instrument may comprise an illumination source and a sensor. The processing unit may comprise a data storage having stored thereon a characterization of the illumination source and a characterization of the sensor. The processing unit may also comprise a computer configured to calculate a system response of the illumination source and the receiving element considering the characterization of the illumination source and the characterization of the receiving element.

In another general aspect, the invention is directed to methods of operating an optical instrument. The optical instrument may comprise an illumination source and a sensor. The methods may comprise the steps of measuring a temperature of the illumination source, and calculating a system response of the optical instrument considering the temperature. Calculating the system response may involve considering a response of the illumination source and a response of the at least one sensor. The methods may also comprise the steps of performing a measurement with the optical instrument, and normalizing the measurement considering the system response.

In yet another general aspect, the invention is directed to methods of characterizing an optical instrument. The optical instrument may comprise a light emitting diode (LED), a sensor, and a spectral filter positioned to filter light incident on the sensor. The methods may comprise the steps of calculating a first response of the LED, calculating a second response of the sensor, and calculating a third response of the spectral filter. The methods may also comprise the step of calculating a system response of the optical instrument. Calculating the system response of the optical instrument may comprise mathematically combining the first, second and third characterizations.

BRIEF DESCRIPTION OF THE FIGURES

Embodiments of the present invention are described herein, by way of example, in conjunction with the following figures, wherein.

DETAILED DESCRIPTION OF THE INVENTION

Various embodiments of the present invention are directed to systems and methods for taking optical measurements that involve characterizing the illumination optics and the receiving optics of an optical instrument to generate a system response. The system response may be used, in various embodiments, to normalize readings from the optical instrument to a generally accepted standard scale or colorspace. In this way, it may be possible to construct optical instruments with less expensive components having less stringent tolerances. It may also be possible to construct optical instruments with components, such as light emitting diodes (LED's) that may not be currently manufactured to tight enough tolerances for use otherwise.

Figure 1:
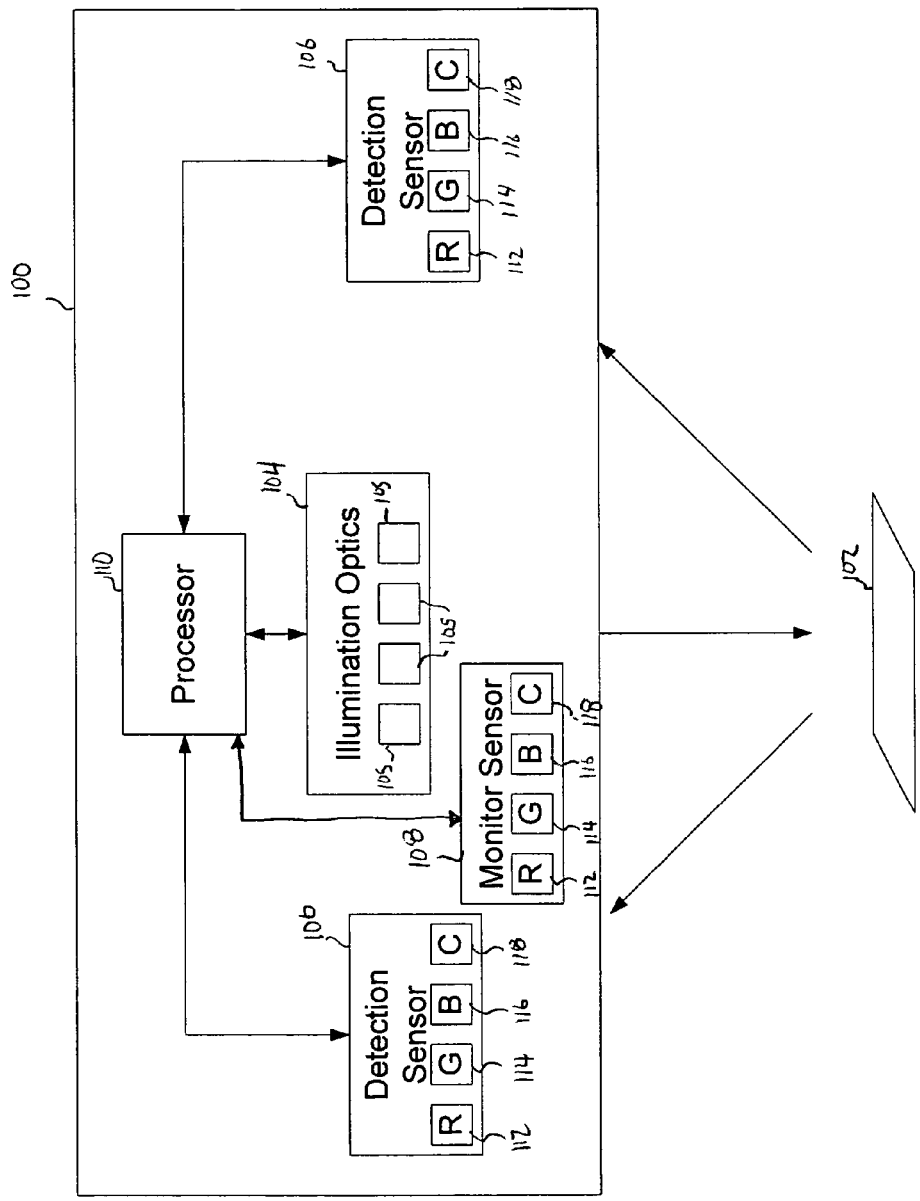
FIG. 1 shows a diagram of an optical instrument according to various embodiments.

FIG. 1 shows a block diagram, according to various embodiments, of an optical instrument 100. The optical instrument 100 may be a spectrometer, or any other optical instrument having illumination optics 104 and detection sensors 106 as shown. For example, in various embodiments, the optical instrument may be a densitometer, a sensitometer, a photometer, etc. In various embodiments, the instrument 100 may include a processing unit 110 or other suitable computing component or device. The processing unit 110 may also have associated memory (not shown), for example, to store component characterizations described below. Also, in various embodiments, some or all of the processing performed for the instrument 100 may be performed by an external computer, processor, etc. (not shown) in communication with the instrument 100 by any suitable wired or wireless data link.

The illumination optics 104 may include any suitable type of illumination source. In various embodiments, the illumination optics 104 may include one or more LED's 105. In various embodiments, the LED's 105 may include individual dies having different nominal peak wavelengths. For example, various LED's 105 may have nominal wavelengths of 405 nm, 430 nm, 470 nm, 505 nm, 527 nm, 570 nm, 590 nm, 630 nm, 660 nm, etc. In various embodiments, the illumination optics may 104 may comprise one or more substrates with the individual LED 105 dies mounted on the substrate. The substrate may be mounted to a circuit board or other component of the instrument 100.

The receiving optics of the instrument 100 may include detection sensors 106 as well as one or more monitor sensors 108. The detection sensors 106 may be positioned to receive light emitted by the illumination optics 104 and reflected by, or transmitted through, sample material 102. Two detection sensors 106 are shown in FIG. 1, although, it will be appreciated that more or fewer could be used. The monitor sensor 108 may be positioned to receive light directly from the illumination optics 104. The signal from the monitor sensor 108 may be used, as described below, to monitor the output of the illumination optics 104. In various embodiments, the monitor sensor 108 may be a dual-beam reference sensor 108 having the capability to discern information about the wavelength of received light (e.g., color). The sensors 106, 108 may be any suitable type of sensors. In various embodiments, for example, the sensors 106, 108 may include TSL230 surface mount sensors available from TEXAS ADVANCED OPTOELECTRONIC SOLUTIONS (TAOS). Also, in various embodiments, the sensors 106, 108 may include any kind of imaging chip or even RGB camera modules.

In various embodiments, it may be desirable for the sensors 106, 108 to discern color. Accordingly, various spectral filters may be positioned on or near the sensors 106, 108 to filter incoming light. For example, the sensors 106, 108 may have active areas 112, 114, 116, 118 having red (112), green (114), blue (116) and/or clear (118) spectral filters. In various embodiments, each of the active areas 112, 114, 116, 118 may include a separate sensor device with a single spectral filter. In other various embodiments, some or all of the sensors 106, 108 may include an array of sensor pixels. The active areas 112, 114, 116, 118 may include a single pixel or group of pixels included in sensors 106, 108 having the appropriate spectral filter positioned to filter incoming light. It will be appreciated that not all of the sensors 106, 108 need to include all of active areas 112, 114, 116, 118. Also, some sensors 106, 108 may include active areas having other types of spectral filters (e.g., other than red, green, blue or clear) in addition to, or instead of one or more of active areas 112, 114, 116, 118.

Figure 2:
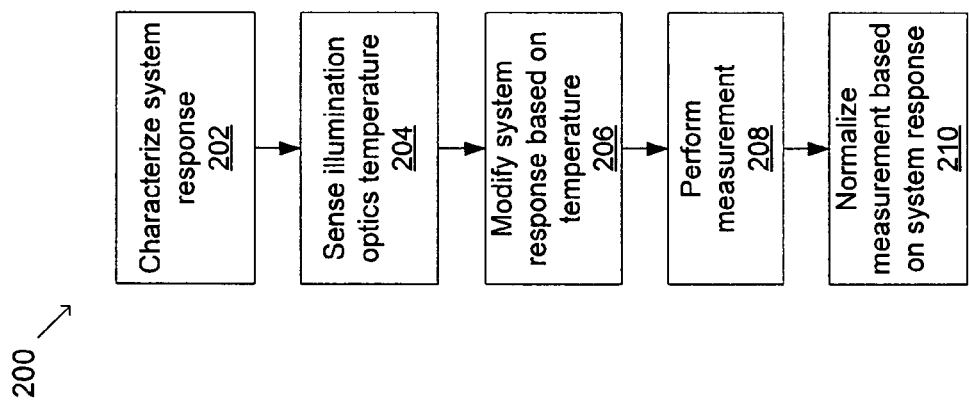
FIG. 2 shows a flow chart of a process flow for operating an optical instrument according to various embodiments.

FIG. 2 shows a process flow 200, according to various embodiments, for using the instrument 100. At step 202 of the process flow 200, the system response of the instrument 100 may be found. The system response may describe how the instrument 100 generally responds to a given input. In various embodiments, the system response may consider the response of the electrical-to-optical components of the system (e.g., the illumination optics 104, LED's 105, etc.) as well as the optical-to-electrical components (e.g. the sensors 106, 108). It will be appreciated that the individual responses of the illumination optics 104 and its LED's 105, as well as the responses of the sensors 106, 108, may be non-linear. Accordingly, it may be desirable to consider the responses of each individually when determining the overall system response. Additional details of determining the system response are discussed below with respect to FIG. 3.

At step 204, a temperature of the illumination optics 104 and LED's 105 may be sensed. It will be appreciated that LED's 105 have a spectral output that changes with temperature. As the spectral output of the LED's 105 change, the response of the illumination optics 104, as well as the overall system response, also changes. Accordingly, after the temperature of the illumination optics 104 is taken, the system response may be modified, at step 206, to take this into account. Additional details of determining the temperature of the illumination optics 104 and LED's 105, according to various embodiments, are discussed below with reference to FIGS. 6-8.

At step 208, a measurement may be performed using the instrument 100. For example, the illumination optics 104 may illuminate the sample material 102. Detection sensors 106 may sense light that is either reflected from or transmitted by the sample material 102. The result may be a reflectance or transmittance of the sample material 102 at the various wavelengths produced by the illumination optics 104 and sensed by the detection sensors 106. At step 210, the result of the measurement taken at step 208 may be normalized based on the system response of the instrument 100. For example, the result may be normalized to a known colorspace. In this way, the instrument may generate an accurate result that can be related to results from other instruments with different system responses.

Figure 3:
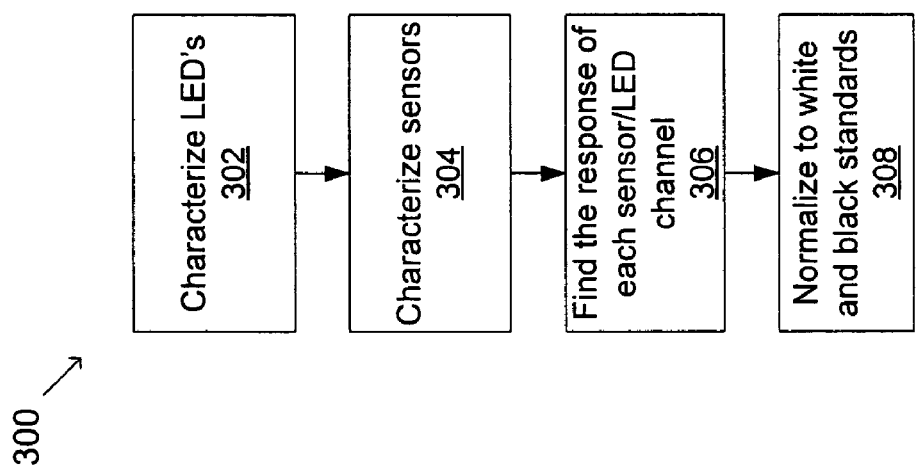
FIG. 3 shows a flowchart of a process flow for characterizing an optical instrument according to various embodiments.

FIG. 3 shows a process flow 300 for developing a system response of the instrument 100 according to various embodiments. At step 302, the LED's 105 of the illumination optics 104 may be characterized. Characterizing the LED's 105 may involve observing one or more optical criteria of the LED's 105 and using the observed criteria to fit the LED's 105 to a model or models of the LED's 105 response. In various embodiments, each of the LED's 105 may be characterized separately to account for variations in behavior due to slight differences in material or manufacture.

The optical criteria of the LED's 105 may be found by illuminating the LED's 105 over a given amount of time and observing them with a spectrometer. In various embodiments, the spectrometer used to characterize the LED's 105 may be the instrument 100 itself. It will be appreciated that illuminating the LED's 105 over a given amount of time may allow them to heat up, providing readings over a range of operating temperatures. Example optical criteria that may be measured include: the spectral output, spectral optical power, spectral optical linearity, degree of collimation, illuminated spot size, spot intensity profile, illumination uniformity, spatial and temporal phase/coherence, temporal modulation, etc. Various optical criteria describing the illumination optics 104 as a whole may also be found.

The observed criteria may then be used to fit the LED's 105 to one or more models. The one or more models may take into account changes in the response of the LED's 105 based on operating conditions. For example, the materials used to produce LED's 105, such as GaAs, GaN, etc., have inherent dispersive properties (e.g., dielectric constant, complex refractive index, etc.) that vary with both wavelength and temperature ($dn/dT$ and $dn/d\lambda$). As a result, the LED's 105 may exhibit behaviors that vary proportionately to $\lambda^2/\Delta\lambda$ as the temperature, forward current and/or forward voltage change. Also, as temperature increases, the physical dimensions of LED's 105 dies may change. This, together with the changes in dispersion, may result in a net shift of the peak wavelength, $\lambda$, output, a decrease in light output, and a change in the bandwidth, $\Delta\lambda$, as the temperature of the LED's 105 change.

Figure 3A:
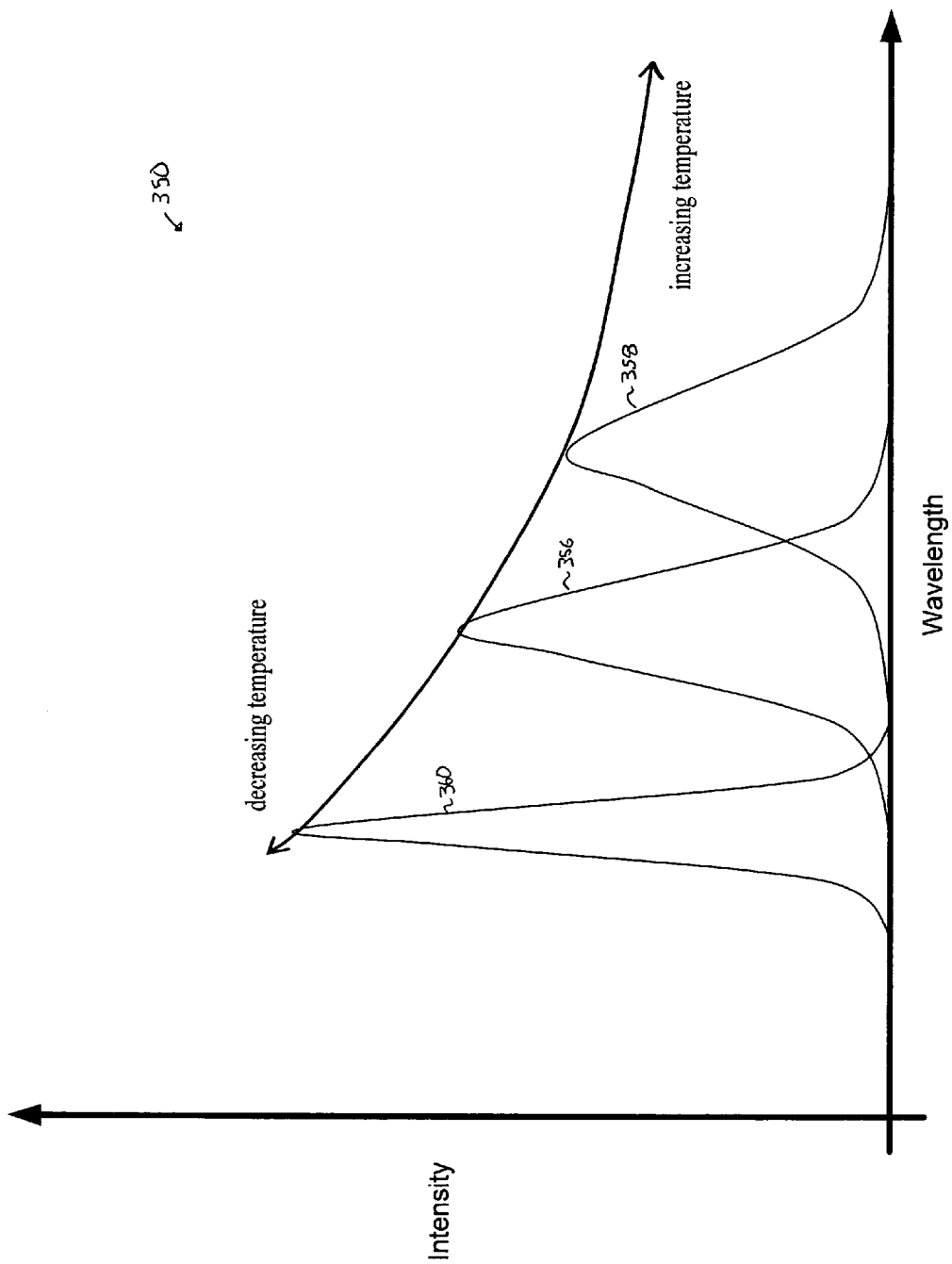
FIG. 3A shows a chart of various response curves of an LED at different temperatures.

For example, FIG. 3A shows a general shape of a model 350 of the spectral output of an LED, according to various embodiments. Three curves 356, 358, 360 are shown representing the output of the LED at three different temperatures. The curve 356 shows the spectral output of the LED at a first temperature. The curve 358 shows the spectral output of the LED at a second temperature higher than the first. Finally, the curve 360 shows the LED at a third temperature lower than the first temperature. It can be seen that, generally, as temperature increases, the LED's spectral output may generally increase in bandwidth and decrease in intensity.

It will be appreciated that, despite tolerance-related variations from LED to LED, most LED's 105 of a similar make-up and structure may conform to the same general model. Accordingly, it may not be necessary to observe the LED's 105 optical criteria over the entire range of operating conditions. Instead, the LED's 105 optical criteria may be observed over a suitable range of known operating conditions, for example, as described above. The observed optical criteria may then be fitted to the appropriate model, for example, by solving for a coefficient or coefficients of the model. Which model or models apply to a particular LED 105 may depend on various factors, including the material from which the LED' 105 are made, the type of dopants used in the LED's 105, their geometric configuration, etc.

Referring back to the process flow 300, at step 304 the sensors 106, 108 may be characterized by measuring one or more optical criteria of the sensors 106, 108. Like LED's 105, one or more physical models may exist describing the response of sensors 106, 108 and their respective active areas 112, 114, 116, 118. Accordingly, characterizing the sensors 106, 108 may involve observing the response of the sensors 106, 108 to various input conditions, and fitting the model or models to the observed results (e.g., by finding a coefficient or coefficients for the model). It will be appreciated that characterizing the sensors 106, 108 may also involve characterizing the spectral filters of the active areas 112, 114, 116, 118. In various embodiments, the respective active areas 112, 114, 116, 118 may be characterized together based on their spectral filter type. For example, all of the red active areas 112 may be characterized together, etc. In this way the sensors 106, 108 and the various spectral filters may be characterized together. Example optical criteria that may be found for each sensor 106, 108 or sensor pixel include: spectral responsivity, spatial and temporal responsivity, field of view, degree of specular rejection, degree of stray light rejection, dynamic range of response, etc.

Figure 4:
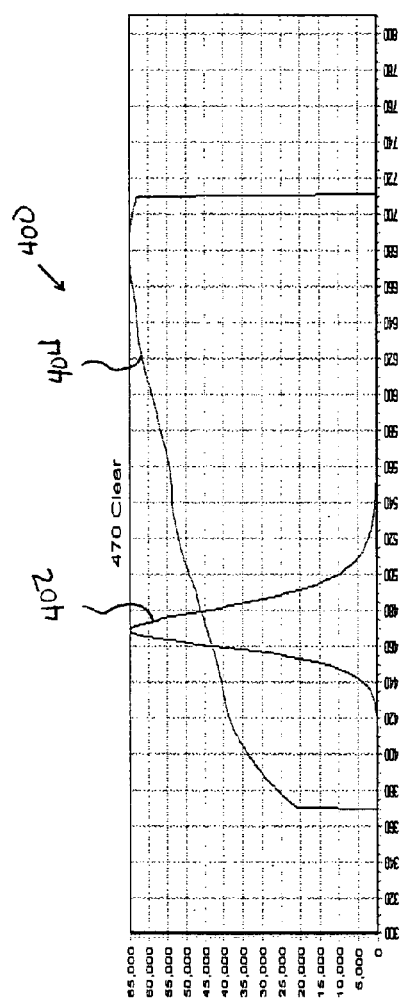
FIGS. 4-6 show plots of the spectral outputs of various LED's and sensor active areas according to various embodiments.
Figure 5:
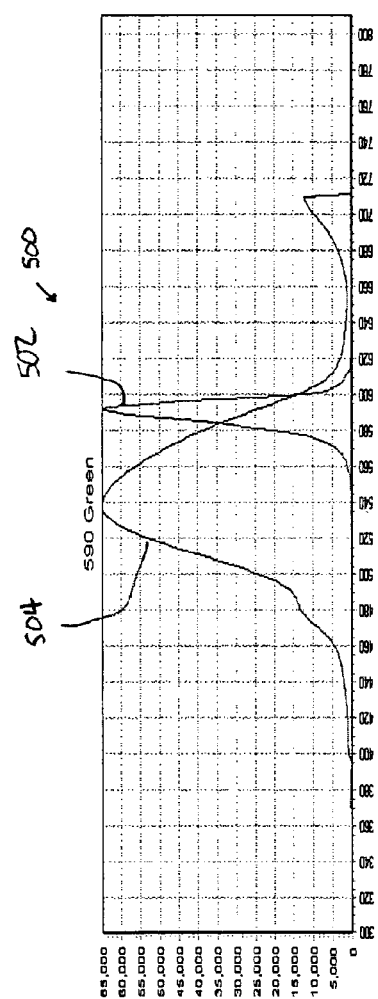

At step 306, a response may be found for each spectral channel of the instrument 100. A channel of the instrument 100 may be the combination of a particular wavelength of LED 105 and all of the sensor 106 active areas of a given type. For example, the combination of a 660 nm LED 105 and the red active areas 112 would be one channel. FIG. 4 shows a chart 400 of a channel comprising a 470 nm LED and the clear active areas 118. Curve 402 represents the spectral output of the LED 105 and curve 404 represents the spectral responsivity of the active areas 118. FIG. 5 shows a second example chart 500 of a second channel comprising a 590 nm LED and the green active areas 114. Curve 502 represents the spectral output of the LED 105 and curve 504 represents the spectral responsivity of active areas 114.

Finding the response of a channel may involve mathematically combining an optical criterion of the LED 105 a corresponding optical criterion of the appropriate active areas 112, 114, 116, 118. For example, finding a spectral response of the channel shown by chart 500 may involve mathematically combining the spectral response 502 of the LED 105 with the spectral responsivity 504 of the sensors. The particular type of mathematical combination used may depend various factors including, the form of the various optical criterion, etc. For example, in various embodiments, the mathematical combination may include one or more of convolution, vector summation, arithmetic summation, etc.

In various embodiments, the responses of the LED's 105, the sensors 106, 108 and/or various channels may be normalized to a common value according to any suitable weighting method. For example, the responses of each of the LED's 105 and each of the sensors 106, 108 may be normalized to a single value (e.g., 65,535). Channel responses may also be normalized. For example, channel responses may be found as a weighted integral response, with each channel response being weighted to the same area (e.g., 512) under the curve. Normalizing the respective responses may be done to conform to total energy conservation, or alternatively, to a normalized object reflection. Also, in various embodiments, the responses may be normalized to represent that portion of the Bi-Directional Reflectance Distribution Function (BRDF) represented by the optical sampling position of the sensor channel. It will be appreciated that, in various embodiments where the LED's 105 are illuminated sequentially during measurement, each may be normalized separately. Referring back to the process flow 300, at step 308, the illumination optics 104 and detection sensors 106 may be normalized to white and black samples. In this way, the channel responses calculated above can be related to appropriate the colorspace.

As discussed above, the temperature of the illumination optics 104 may be sensed, for example, at step 204 of the process flow 200. In various embodiments, this temperature may be taken by observing the spectral shift of one or more of the LED's 105, for example, using the monitor sensor 108. As described above, the monitor sensor 108 may be positioned to directly, or indirectly, observe the illumination optics 104. The spectral shift of one or more of the LED's 105 may be found by observing the LED's through active areas 112, 114, 116, 118 that are spectrally adjacent to each other.

Figure 6:
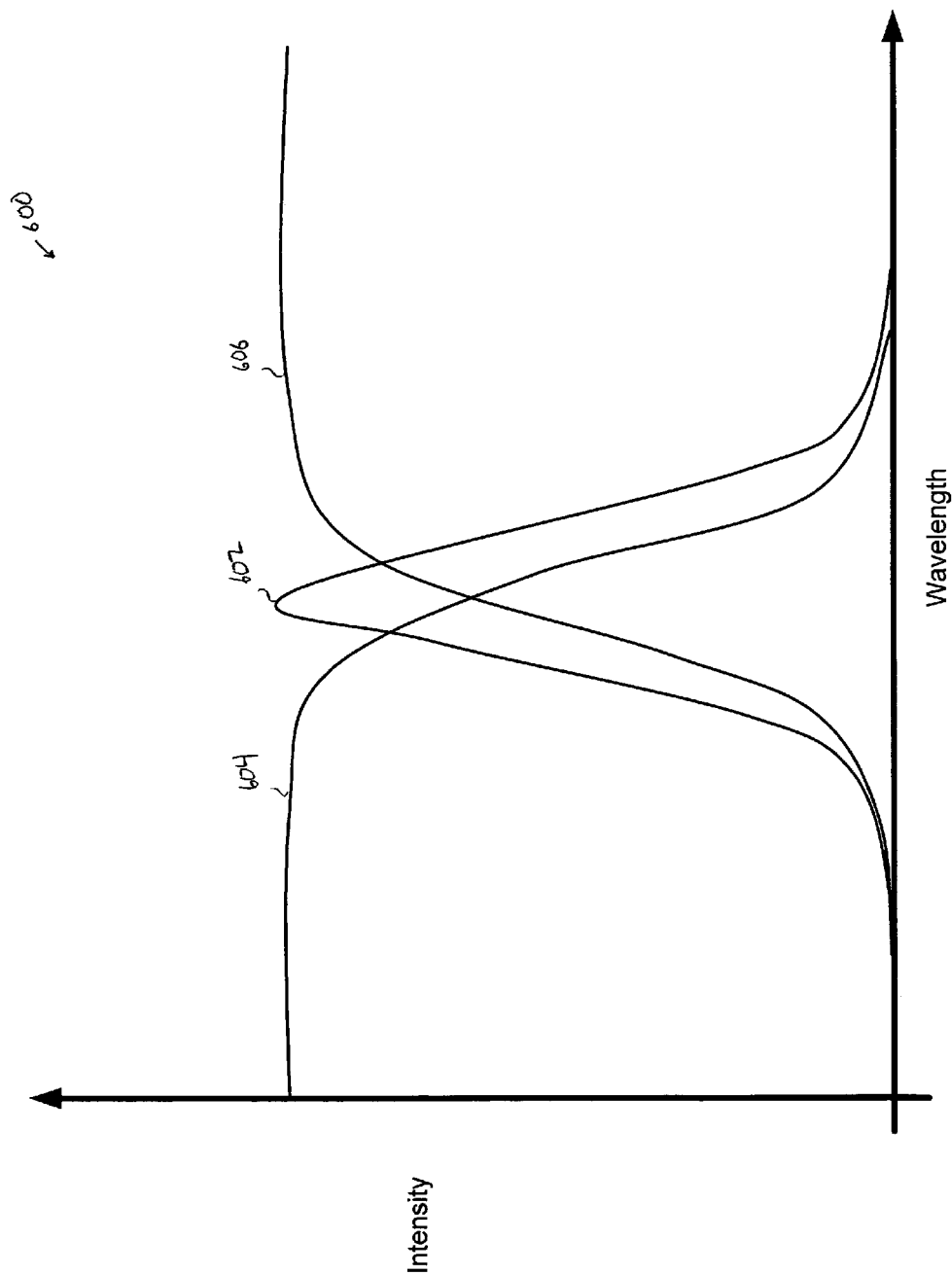

For example, FIG. 6 shows a diagram 600 of the spectral responses of an LED 105, the green active areas 114 and red active areas 112 of the sensor 108. Curve 602 represents the spectral output of a 590 nm LED 105, while curves 604 and 606 represent the spectral responses of green 114 and red 112 active areas respectively. The respective green and red spectral filters used by green 114 and red 112 active areas may be chosen to have adjacent or roughly overlapping attenuation bands at about the peak wavelength of the LED 105, shown by LED curve 602. Because the example LED 105 shown has a nominal peak wavelength of 590 nm, its spectral response may fit roughly between the pass bands of the green 114 and red 112 active areas. Although the present example is presented with a 590 nm LED and with green and red spectral filters, it will be appreciated, however, that any suitable LED and filter combination may be used. For example, a 505 nm LED and/or a 525 nm LED could be used in conjunction with blue and green filters.

Referring again to FIG. 6, it will be appreciated that as the temperature of the LED 105 changes, the position and/or shape of the curve 602 will also change in a predictable way, for example, as shown above by FIG. 3A. As the temperature of the LED 105 increases, the LED spectral output 602 may be shifted to a longer wavelength (to the right in the diagram 600). When this occurs, more of the LED's total output may be attenuated by green active area 114 (curve 204), and more of the LED's total output may be passed by the red active area 112 (curve 206). As the temperature of the LED 105 decreases, the opposite may occur. Accordingly, the peak wavelength of the LED 105, and therefore its temperature, may be sensed by comparing the intensity of the LED 105 as viewed by active area 114 to the intensity of the LED 105 as viewed through active area 112. In various embodiments, where the LED's 105 are mounted in close proximity, it may be assumed that the temperature of one LED 105 is the temperature of some or all of the LED's 105 in the illumination optics.

Figure 7:
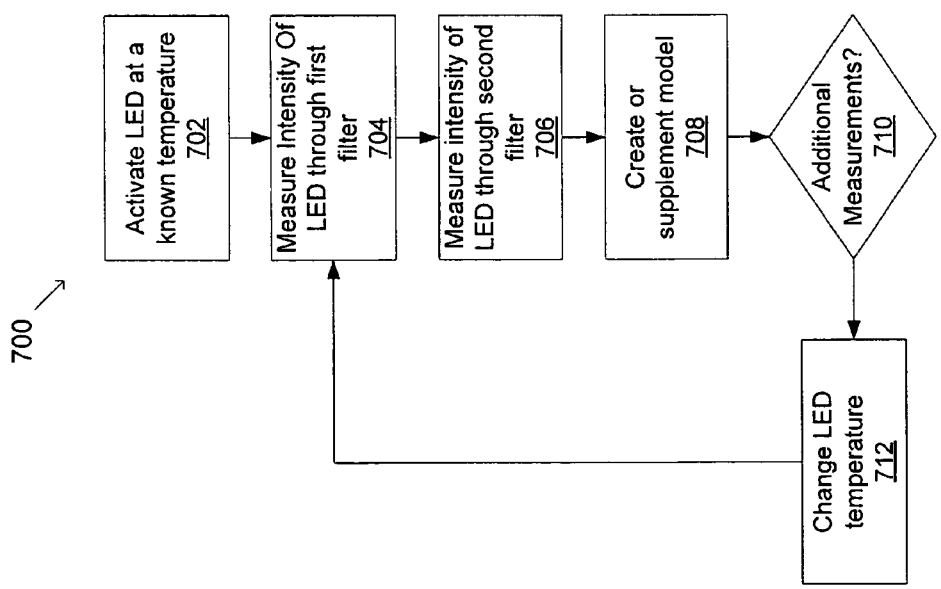
FIG. 7 shows a flowchart of a process flow for calibrating an temperature measurement system according to various embodiments.

FIG. 7 shows a process flow 700, according to various embodiments, illustrating a method for calibrating the instrument 100 for sensing the temperature of an LED 105. It will be appreciated that the steps of the process flow 700 may be performed in any suitable order, and that some or all of the steps may be performed simultaneously. At step 702, the LED 105 may be activated at a first known temperature. The intensity of the LED 105 as viewed by the green active area 114 may be measured at step 704. The intensity of the LED 105 as viewed by the red active area 112 may be measured at step 706. At step 708, the processing unit 110 may create or supplement a model relating the temperature of the LED 105 and the intensity of the LED 105 as viewed through the active areas 112, 114 (e.g., the model shown above at FIG. 3A). In various embodiments, creating or supplementing the model may involve calculating one or more coefficients matching the observed intensities to the model. In various embodiments, the processing unit 110 may also explicitly solve for the peak wavelength of the LED 105.

At decision step 710, the computer may determine whether additional measurements will be taken to further supplement the model. If an additional measurement is desired, the temperature of the LED 105 may be changed at step 712. For example, the temperature of the LED 105 may be varied by allowing it to be activated for a given period of time, activating additional LED's near the LED 105, etc. The process may then continue with step 704 as described above. It will be appreciated that one measurement may be sufficient to develop the model, however, additional measurements may improve the accuracy of the model. Also, taking measurements over a broad range of temperatures or other operating conditions may allow the model to compensate for nonlinearities in LED heating behavior, the effects of additional LED's (not shown) near the LED 105, etc.

Figure 8:
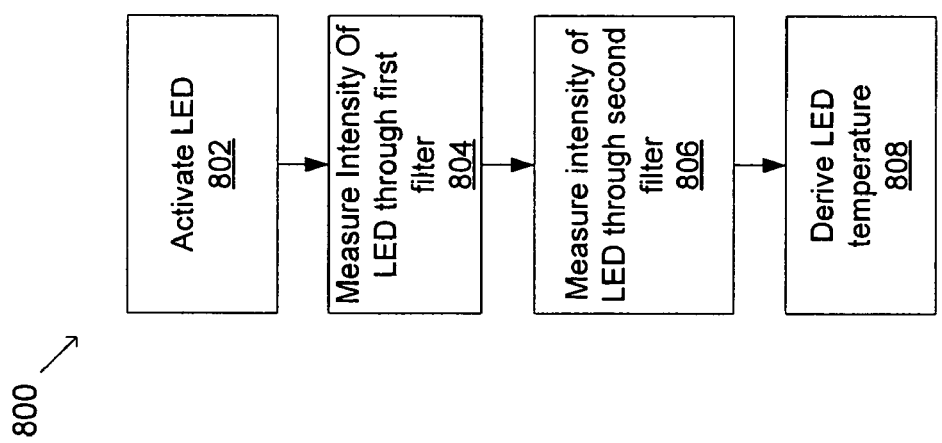
FIG. 8 shows a flowchart of a process flow for measuring a temperature of an LED according to various embodiments.

FIG. 8 shows a process flow 800, according to various embodiments, for measuring the temperature of the LED 105 with the instrument 100, for example, as described above at step 204 of process flow 200. Referring back to the process flow 800, at step 802, the LED 105 may be activated. The intensity of the LED 105 may be measured through green active area 114 at step 804, and the intensity of the LED 105 through red active area 112 may be measured at step 806. It will be appreciated that the respective intensities of the LED 105 as viewed by active areas 112, 114 may be measured near the time that the LED 105 is activated, or at any time thereafter. At step 808, the first and second intensities of the LED 105 may be used to calculate a temperature of the LED 105, for example, according to a model generated as described above. The temperature of the LED 105 may then be used in any suitable way, for example, as described above. It will be appreciated that other LED's included in the illumination optics 104 may be assumed to have the same temperature as the LED 105. This assumption is likely to be more accurate where all of the LED's in the illumination optics 104 are activated for similar amounts of time under similar conditions.

It is to be understood that the figures and descriptions of the present invention have been simplified to illustrate elements that are relevant for a clear understanding of the present invention, while eliminating, for purposes of clarity, other elements, such as, for example, details of various physical models of LED's, etc. Those of ordinary skill in the art will recognize that these and other elements may be desirable. However, because such elements are well known in the art and because they do not facilitate a better understanding of the present invention, a discussion of such elements is not provided herein.

As used herein, a "processing unit," "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

The processing unit 110 may operate according to software code to be executed by a processor or processors of the processing unit 110 or any other computer system using any type of suitable computer instruction type. The software code may be stored as a series of instructions or commands on a computer readable medium. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

We claim:

1. An optical instrument comprising:
   a. illumination optics including one or more illumination sources;
   b. receiving optics including one or more sensors adapted to receive light from the illumination optics; and
   c. a processing unit having data storage means, the processing unit also including:
      i. means for characterizing a system response for the optical instrument;
      ii. means for determining one or more temperatures of the one or more illumination sources based on optical criteria detected by the receiving optics;
      iii. means for refining the characterization of the system response based on determination of the one or more temperatures.

2. The optical instrument of claim 1, wherein the means for characterizing a system response includes:
   a. means for characterizing the one or more illumination sources;
   b. means for characterizing the one or more sensors;
   c. means for determining a response for each spectral channel of the optical instrument; and
   d. means for normalizing the illumination optics and the receiving optics to white and black standards.

3. The optical instrument of claim 1, wherein the means for determining one or more temperatures includes adaptation of the one or more sensors to detect a spectral shift of one or more of the one or more illumination sources.

4. The optical instrument of claim 2, wherein the means for characterizing the one or more illumination sources is adapted to:
   a. detect at least one optical criteria selected from the group consisting of: spectral output, spectral optical power, spectral optical linearity, degree of collimation, illuminated spot size, spot intensity profile, illumination uniformity, spatial and temporal phase, and temporal modulation; and
   b. use the detected optical criteria to select at least one model for the one or more illumination sources.

5. The optical instrument of claim 3, further comprising one or more spectral filters positioned on or near one or more of the one or more sensors and defining one or more active areas, wherein the one or more active areas are adapted to detect the spectral shift.

6. The optical instrument of claim 2, wherein the means for characterizing the one or more sensors is adapted to:
   a. detect at least one optical criterion selected from the group consisting of spectral responsivity, spatial responsivity, temporal responsivity, field of view, degree of specular rejection, degree of stray light rejection and dynamic range of response; and
   b. use the detected at least one optical criterion to select at least one model for the one or more sensors.

7. A method of operating an optical instrument, the optical instrument comprising illumination optics including one or more illumination sources, and receiving optics including one or more sensors adapted to receive light from the illumination optics, the method comprising:
   a. characterizing a system response for the optical instrument;
   b. determining one or more temperatures of the one or more illumination sources, based on optical criteria detected by the receiving optics; and
   c. refining the characterization of the system response based on the one or more temperatures.

8. The method of claim 7, further comprising:
   a. performing a measurement with the optical instrument; and
   b. normalizing the measurement based on the refined characterization of the system response.

9. The method of claim 7, wherein the step of characterizing a system response includes:
   a. characterizing the one or more illumination sources;
   b. characterizing the one or more sensors;
   c. determining a response for each spectral channel of the optical instrument; and
   d. normalizing the illumination optics and the receiving optics to white and black standards.

10. The method of claim 7, wherein the step of determining one or more temperatures includes using one or more of the one or more sensors to detect a spectral shift of one or more of the one or more illumination sources.

11. The method of claim 10, wherein the optical instrument further comprises one or more spectral filters positioned on or near one or more of the one or more sensors and defining one or more active areas, wherein the one or more active areas are used to detect the spectral shift.

12. The method of claim 9, wherein the determining a response for each spectral channel includes mathematically combining an optical criterion of one of the illumination sources with a corresponding optical criterion of an active area of the one or more sensors, wherein the mathematically combining comprises at least-one of the group consisting of taking a convolution, taking a vector sum, and taking an arithmetic sum.

13. A method for characterizing a system response for an optical instrument, the optical instrument comprising illumination optics including one or more illumination sources and receiving optics including one or more sensors, the method comprising:
   a. characterizing the one or more illumination sources;
   b. characterizing the one or more sensors;
   c. determining a response for each spectral channel of the optical instrument; and
   d. normalizing the illumination optics and the receiving optics to white and black standards.

14. The method of claim 13, wherein the characterizing of the one or more illumination sources comprises:
   a. detecting at least one optical criterion of one or more of the one or more illumination sources over a first range of operating conditions; and
   b. using the detected at least one optical criterion to select at least one model for the one or more illumination sources.

15. The method of claim 14, wherein the at least one optical criterion is selected from the group consisting of: spectral output, spectral optical power, spectral optical linearity, degree of collimation, illuminated spot size, spot intensity profile, illumination uniformity, spatial and temporal phase, and temporal modulation.

16. The method of claim 14, wherein the detection of at least one optical criterion over a first range of operating conditions comprises illuminating one or more of the one or more illumination sources over a period of time; and accounting for changes in temperature over the period of time.

17. The method of claim 13, wherein the determining a response for each spectral channel includes mathematically combining an optical criterion of one of the illumination sources with a corresponding optical criterion of an active area of the one or more sensors, wherein the mathematically combining comprises at least-one of the group consisting of taking a convolution, taking a vector sum, and taking an arithmetic sum.

18. The method of claim 13, wherein the characterization of the one or more sensors includes:

a. detecting at least one optical criterion of one or more active areas of the one or more sensors; and b. using the detected at least one criterion to select at least one model for the one or more sensors.

19. The method of claim 18, wherein the at least one optical criterion is selected from the group consisting of spectral responsivity, spatial responsivity, temporal responsivity, field of view, degree of specular rejection, degree of stray light rejection and dynamic range of response.

20. The method of claim 13, wherein the response for each spectral channel is normalized to a colorspace.

\* \* \* \* \*